Jan. 12, 1932.     R. SHELDRICK ET AL     1,840,682
CLUTCH DEVICE
Filed Oct. 10, 1929

Inventor
Robert Sheldrick.
Leonard Heap.

Patented Jan. 12, 1932

1,840,682

UNITED STATES PATENT OFFICE

ROBERT SHELDRICK, OF FAIRBANK, AND LEONARD HEAP, OF TORONTO, ONTARIO, CANADA

CLUTCH DEVICE

Application filed October 10, 1929. Serial No. 398,776.

The principal objects of this invention are to provide a safety clutch adapted to carry a predetermined load but which will effectively prevent the transmission of a greater load or pressure than is desired, and to provide a clutch device particularly adapted for use on starting cranks for internal combustion engines which will eliminate the possibilities of injury through the back-firing of an engine.

The principal feature of the invention consists in the novel construction and arrangement of a pair of clutch members and of the means for holding these in operating engagement whereby a member rotatably mounted upon a shaft and provided with means on the end face for engaging a member rotatable with the shaft is held in operating contact with the member secured to the shaft by a longitudinal spring pressure.

In the accompanying drawings, Figure 1 is a perspective view of a motor car starting crank to which the present invention is applied.

Figure 1:
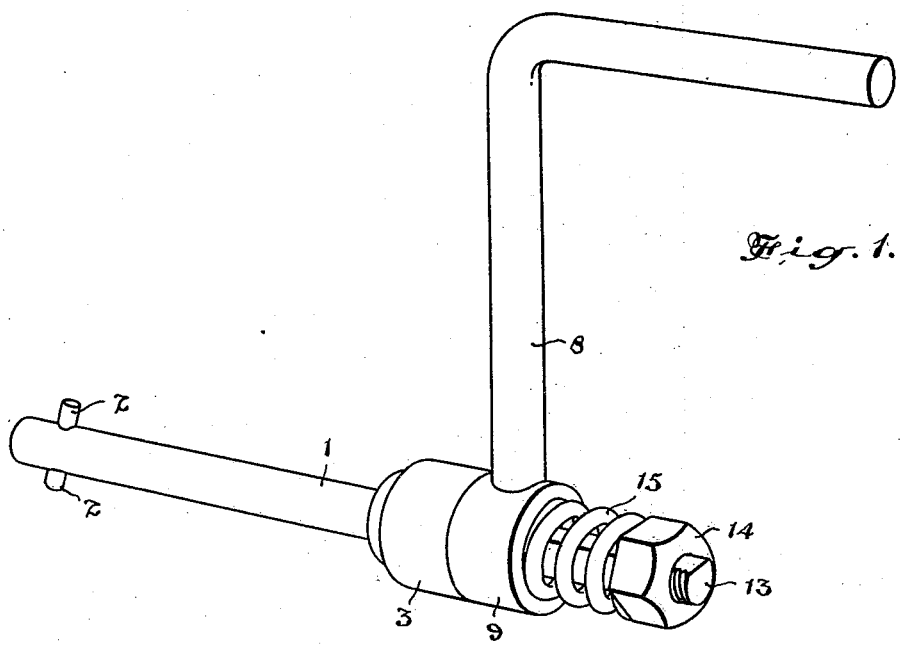
Figure 2:
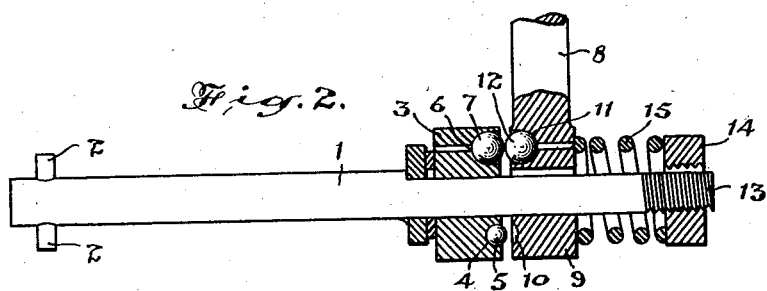
Figure 2 is a longitudinal sectional view showing the clutch members in the position of passing each other.
Figures 3, 4:
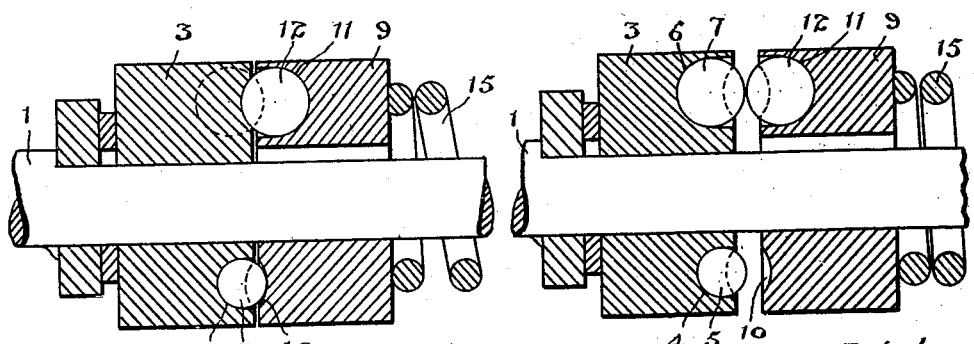
Figure 3 is an enlarged longitudinal sectional view showing the crank members in operating engagement.
Figure 4 is a longitudinal sectional view showing the crank members in the position of passing each other as shown in Figure 2.

Safety clutches of various kinds have been devised which permit the transmission of power from one member to another up to a certain predetermined maximum load, after which the clutch members fail.

The use of a crank for starting internal combustion engines is frequently necessary and many painful accidents result from the back firing of the engine.

The invention herein described proposes to overcome these difficulties in the matter of clutches.

The invention as shown consists of a shaft 1 which is provided with the usual cross pin 2 for engaging the ratchet end of the engine shaft. The other end of the shaft 1 is flattened for a portion of its length along one side and on this flattened portion is mounted a cylindrical block 3. This block is provided with a recess 4 in which is loosely secured a hardened steel ball 5.

Diametrically opposite to the recess 4 is arranged a larger recess 6 in which is arranged a larger ball 7.

The crank 8 is provided with a circular hub end 9 which is rotatably mounted upon the shaft 1 and preferably has a ball race 10 which engages the outer perimeters of both the balls 5 and 7.

A recess 11 is formed in the hub 9 in which is embedded a steel ball 12, preferably of the same diameter as the ball 7.

The balls 5 and 7 rest against the end face of the hub 9 and upon the turning of the hub 9 the ball 12 moves into engagement with the ball 7. These balls project a sufficient distance from their respective holding members that when they move into contact they have a substantial bearing angle which will cause, through the operation of the crank, the turning of the shaft 1 against a considerable pressure.

The outer end 13 of the shaft 1 is threaded and on it is mounted a nut 14 and a heavy coil spring 15 is arranged between the nut and the hub 9 of the crank.

The pressure of the spring 15 may be regulated in accordance with the load which is to be moved by the operation of the crank member and the spring is compressed until the contacts of the balls 7 and 12 are such as to ensure the turning of the shaft under the normal load. Such for instance, the compression pressure in the starting of an engine.

The adjustment of the pressure of the spring 15 by means of the nut will enable the user to obtain sufficient pressure through the contact of the balls 7 and 12 to turn over the engine but in the event of a sudden excess of pressure, such as created by the back firing of the engine, the spring will give way, permitting the turning of the shaft 1 in a backward direction without causing the crank to turn backward with an injurious force.

It will of course be understood that a forward pressure is being exerted by the operator and the force is applied through the engaging balls. When a greater resistance occurs through the engine back firing, the ball contact of the block 3 forces the ball contact of the crank outwardly against the pressure of the spring 15 and passes same.

The arrangement of a ball contact in these two members is of very great importance as the steel balls have remarkable wearing qualities. Their contacts are only on a point and while the lines of force are such as to effectively operate the engine under the normal stresses, an excess stress will change the lines of force through the balls quite readily. Further it will be noted that the ball 5 forms a friction reducing contact between the members 3 and 9 at a point diametrically opposite the main clutch balls 7 and 12. Thus the pressure of the spring 15 does not set up an undue frictional resistance between the surfaces of the members 3 and 9, the actual adjacent surfaces thereof being spaced at all times. In this way the force that the contacting clutch balls 7 and 12 will transmit may be more definitely determined as would not be the case if the ball bearing 5 was omitted permitting the faces of the members 3 and 9 to rub in frictional contact which friction would vary in relation to the presence or absence of a lubricant therebetween.

The ball 5 is here shown of smaller size than the clutch balls 7 and 12, the smaller ball serving efficiently for bearing purposes and being less costly than would a larger ball. The ball 5 however may if desired be of a size corresponding to the size of the ball 7 in which case it will not only serve as a bearing support as defined above but will co-operate with the ball 12 so that a uniform double-clutching action will be provided for each revolution of the member 9 on the shaft.

The device while shown applied to a motor car crank can of course be readily applied to various other forms of clutch mechanisms where a safety limit of stress is desired.

The construction is very simple and it can be manufactured at very little cost in addition to that of the ordinary crank.

What we claim as our invention is:

1. In a clutch device, the combination with a shaft, of a block keyed on the said shaft having a recess in its end face, a steel ball embedded in said recess and projecting beyond the end face, a member rotatably mounted on the shaft having a steel ball projecting from its end face adapted to engage the aforesaid steel ball upon rotation of the rotatable member on the shaft, and spring means mounted on the shaft for holding the rotatable member toward the member secured to the shaft.

2. In a clutch device, the combination with a shaft, of a cylindrical block keyed to the shaft having a recess in its end face, a ball bedded in the recess projecting beyond the end face, a member rotatably mounted on the shaft having a ball bedded in its end face adapted to engage the aforesaid ball to effect the turning of the shaft, a spiral spring encircling said shaft for holding said blocks and rotatable member together, and a nut threaded on the shaft for adjusting the compression of said spring.

3. In a clutch device, a shaft, a cylindrical block rigidly mounted on said shaft, a ball mounted in the end face of said block and projecting therebeyond, a steel ball bedded in a recess in the end face of said block in diametrically opposed relation to the aforesaid ball, a rotatable member mounted on the shaft having a ball race engaging the aforesaid balls, said latter member having a recess arranged in the path of said ball race, a ball bedded in said recess and adapted to engage one of the balls in the aforesaid block while the other ball engages the ball race in bearing contact, the contact of said balls being adapted to effect the turning of the shaft, a spiral spring coiled around the end of said shaft and exerting an end thrust against the member rotatable on the shaft, a nut threaded on the end of said shaft adapted to adjust the pressure of said spring, and means secured to said rotatable member for turning it to turn the shaft.

4. An engine starting crank, comprising a shaft having a pin to engage the engine shaft ratchet, a block rigidly secured on said shaft and having a steel ball secured in its outer end face and projecting therefrom, a crank member having a cylindrical end rotatably mounted on said shaft, a steel ball bedded in the end face of said cylindrical part of the crank adapted to engage the end face of the fixed member on the shaft and to co-operate with the ball therein, a spiral spring encircling the outer end of the shaft and engaging the crank member and holding it toward the block secured on the shaft, and a nut threaded on the outer end of said shaft for adjusting the pressure of said spring.

5. In a clutch device, the combination with a shaft, a member fixed to said shaft having an annular bearing surface and a raised projection extending above said bearing surface, a member rotatably mounted on said shaft having an annular bearing surface and a raised projection extending thereabove, the raised projections of said members being adapted to engage the annular bearing surfaces of said members and to contact with each other to effect the turning of the shaft, and spring means for holding the rotatable member toward said fixed shaft member with the raised projections of said members in bearing contact with their respective annular bearing surfaces.

ROBERT SHELDRICK.
LEONARD HEAP.